United States Patent [19]

Thompson

[11] Patent Number: 5,472,790
[45] Date of Patent: Dec. 5, 1995

[54] PREPARATION AND TRANSFER SHEET

[75] Inventor: Roderick Thompson, Solana Beach, Calif.

[73] Assignee: New Age Products, Inc., San Marcos, Calif.

[21] Appl. No.: 259,006

[22] Filed: Jun. 13, 1994

Related U.S. Application Data

[63] Continuation-in-part of Ser. No. 994,665, Dec. 22, 1992, abandoned.

[51] Int. Cl.$^6$ ..................................................... B32B 27/00
[52] U.S. Cl. ........................ 428/500; 428/195; 428/220; 428/332; 428/337; 428/339; 428/411.1
[58] Field of Search ........................... 430/281, 288; 428/131, 323, 195, 220, 332, 337, 500, 339, 411.1, 216, 35.7; 156/201; 427/393.5

[56] References Cited

U.S. PATENT DOCUMENTS

| | | | |
|---|---|---|---|
| 2,778,324 | 1/1957 | Mattson | 107/46 |
| 2,935,107 | 5/1960 | Bertelsen | 146/215 |
| 3,448,913 | 6/1969 | Wolff | 229/14 |
| 3,837,634 | 9/1974 | Cobb | 269/289 |
| 4,192,494 | 3/1980 | Mima | 269/289 R |

FOREIGN PATENT DOCUMENTS

| | | |
|---|---|---|
| 54-063972 | 5/1979 | Japan . |
| 1185226 | 7/1989 | Japan . |
| 4043506 | 2/1992 | Japan . |
| 882231 | 3/1988 | South Africa . |
| 2248177 | 4/1992 | United Kingdom . |

OTHER PUBLICATIONS

"Encyclopedia of Polymer Science and Engineering", 1988, Wiley & Sons, vol. 13, pp. 481–486. See table 15.
"Encyclopedia of Polymer Science and Engineering", Wiley & Sons, vol. 7, p. 89.
"Encyclopedia of Polymer Science and Technology", vol. 11, pp. 609–613.
Counter Maid Product Brochure, published 1983 (see transmittal letter).

*Primary Examiner*—Patrick J. Ryan
*Assistant Examiner*—William A. Kaynski
*Attorney, Agent, or Firm*—Brown, Martin Haller & McClain

[57] ABSTRACT

A thin polypropylene sheet is extruded flat, with a thickness in the range of 0.008 to 0.060 inches with a Rockwell hardness between 72 and 90 and a flexural modulus between 55,000 psi and 200,000 psi. The resultant surface may be utilized for cutting and chopping foods. A sharp knife will penetrate, but not perforate, the sheet material to not dull the knife while maintaining the integrity of the surface. When flexed around its longitudinal centerline, the sheet material develops substantial cantilever beam strength, so as to transport food articles after preparation into an appropriate container.

9 Claims, 1 Drawing Sheet

U.S. Patent
Dec. 5, 1995
5,472,790
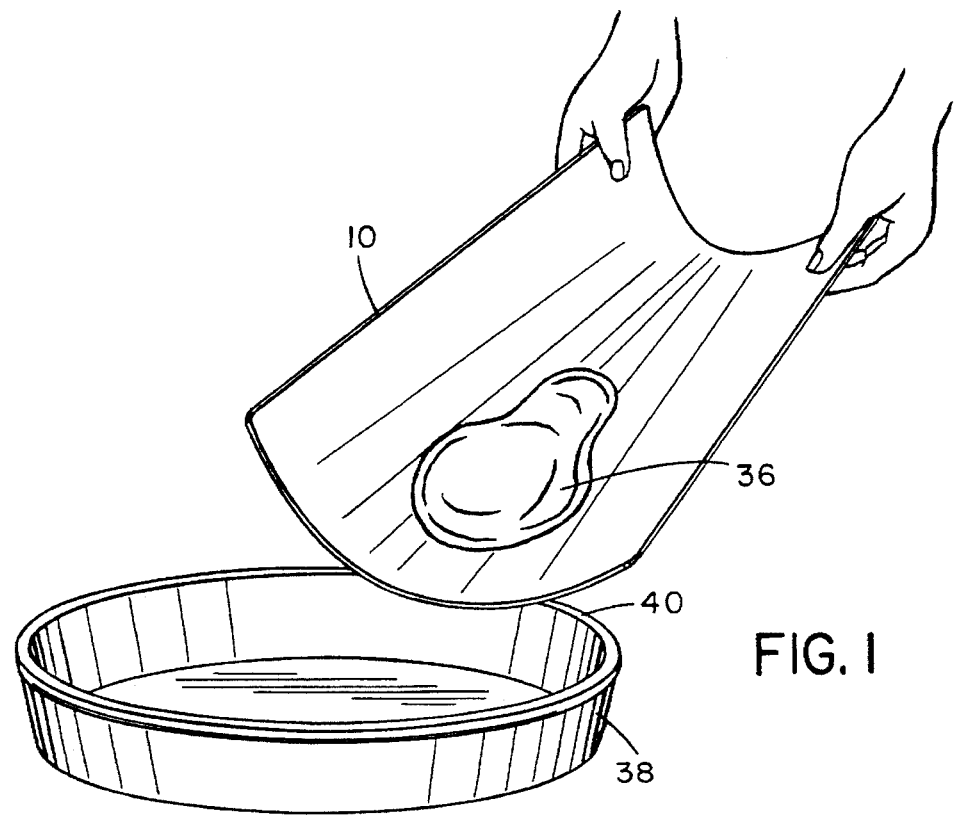
FIG. 1
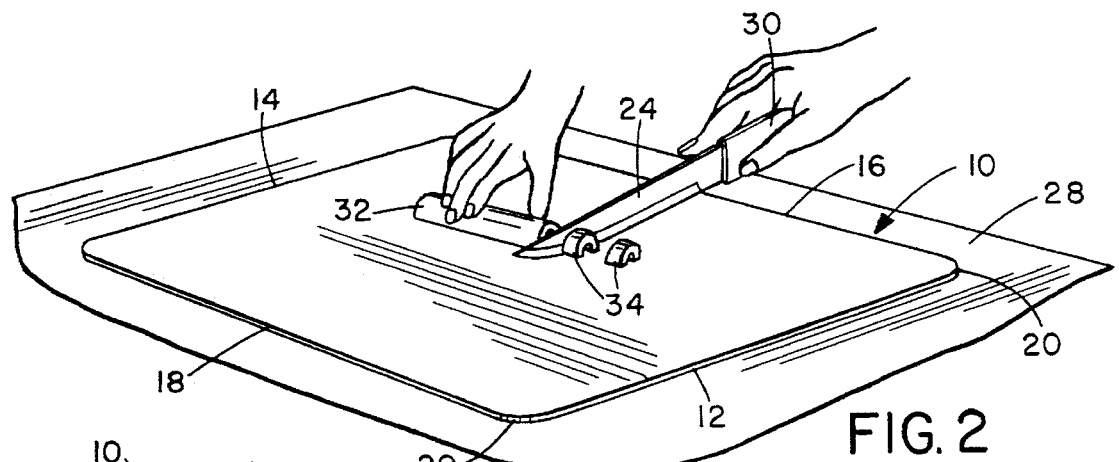
FIG. 2
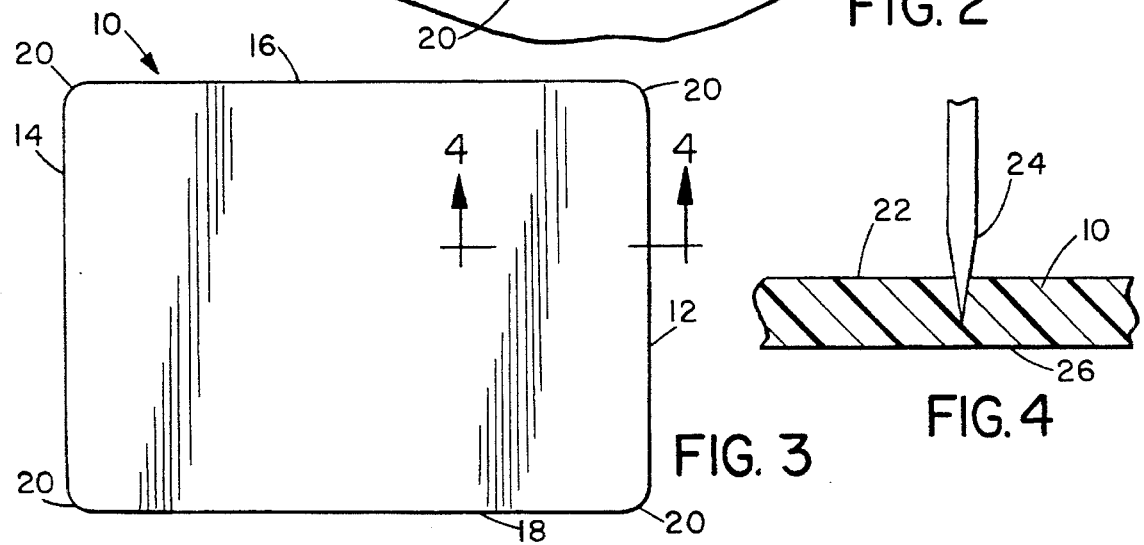
FIG. 3
FIG. 4

PREPARATION AND TRANSFER SHEET

CROSS-REFERENCES TO RELATED APPLICATIONS

This is a Continuation-in-Part of application Ser. No. 07/994,665, filed Dec. 22, 1992, now abandoned.

BACKGROUND OF THE INVENTION

The cutting surfaces available for example, in a typical household kitchen, have known deficiencies, all of which limit their usefulness in food preparation. Plastic and wood kitchen counter tops may be marred by preparing food on their surfaces. Ceramic counter top surfaces may dull the knife or other utensil being utilized. Many surfaces utilized in a kitchen have sufficient porosity so as to harbor bacteria. These include wooden cutting boards and certain of the rigid plastic transportable boards. A documented concern over the transport of bacteria, such as salmonella bacteria commonly found on chicken to other food subsequently processed on the cutting surface, has lead to recommendations ranging from disinfecting the surfaces to preparing the chicken only after other food has been prepared. The concern over bacterial contamination is especially difficult to resolve with fixed cutting surfaces, such as counter tops and chopping blocks. Even those portable cutting surfaces are not easily sterilized, and may not withstand the heat of dish washing. A requirement for sterilizing after use leads to the requirement of multiple portable devices for the preparation of a single meal.

After food is prepared by conventional techniques, it must be handled again to move it from the cutting surface to the container.

Various previous devices have been proposed to resolve the known deficiencies of cutting surfaces. These include cutting surfaces which are protected by disposable tear-off sheets, including thin plastic sheets that may be placed over conventional surfaces. However, known tear-off or cover sheets have not had sufficient strength to avoid perforation during food preparation, or to act as an effective transport for transferring the food after preparation to another container.

Hinged cutting surfaces, which may be folded along two hinge lines in order to provide a funneling effect for the transfer of prepared food articles to a container, have been proposed. However, such devices are not easily cleaned because of the crevices formed by the hinging effect, are expensive and are limited to the formation of a crude trough, and will not conform to the shape of the container to which the food is to be transferred.

Resilient cutting surfaces, which may be flexed into an arcuate trough to provide a funneling effect for the transfer of food articles, have also been proposed. However, such products, when sufficiently thin to be flexed for transfer, do not have sufficient strength to resist perforation and for supporting the food articles when cantilevered from one end. Furthermore, such known prior cutting surfaces may be formed from roll stock, which results in the finished product having a bias toward reassuming a curved configuration, which makes it difficult to maintain the sheet material in contact with the supporting surface as food articles are loaded onto the surface and during preparation. Those articles having sufficient rigidity are often opaque or translucent and have a rough texture, making it difficult to identify and confirm the cleanliness of the articles.

It is therefore desirable to have a flexible article handling sheet which lies flat on a supporting surface, and resists perforation during normal household cutting and chopping operations. Such an article is particularly desirable where it has sufficient cantilever beam strength to lift and transport a substantial quantity of prepared food articles from a sheet to a suitable container of varying shape.

SUMMARY OF THE INVENTION

In an exemplary embodiment of the invention, the deficiencies of the prior art devices are resolved by an extruded sheet of amorphous polypropylene co-polymer cut to a size suitable for food preparation or other article handling. The thickness of the sheet and the characteristics of the polypropylene allow a user to flex the board into a cantilever or funnel shape so that articles can be lifted and transported on the board. In addition, unlike cutting boards formed from roll stock, the extruded cutting board of the present invention tends to lay flat rather than reassume a curved configuration.

The sheet must be sufficiently hard to resist perforation and spalling, but without substantial dulling effect upon most knives or other kitchen implements. It has been discovered that a material having a Rockwell hardness of between 72 and 90 is suitable. In addition, the sheet must have sufficient cantilever beam strength to support a substantial amount of food, or other articles, at the end of the sheet opposite the held end. It has been found that material having a thickness between 0.008 inches and 0.060 inches in combination with a flexural modulus of between 55,000 PSI and 200,000 PSI is suitable. In the exemplary embodiment, the thickness of the sheet is approximately 0.010 inches and the flexural modulus is 145,000 PSI, which results in a sheet that may be easily bent around its longitudinal centerline and held at one end by the user. When placed over the edge of a container, the sheet conforms to provide a substantial line of support. For example, when placed over the edge of a round bowl, the sheet will contact the upper edge of the round bowl over a substantial part of the circumference of the bowl, allowing the user to incline the sheet and to cause the food articles to slide under the influence of gravity into the container.

The advantages of the invention are particularly realized in a generally rectangular sheet greater than 10 inches in length and greater than six inches in width. Although myriad types of polypropylene, each having a unique combination of physical properties such as hardness, flexural modulus and density, are commercially available, it has been discovered that only a material having a combination of physical properties in the ranges described above achieves the advantages of providing lay-flat characteristics, a suitable funneling effect, and suitable resistance to perforation.

The extruded sheet has a smooth surface finish such as to not interfere with any selected transparency. The finish may be tinted to any suitable hue or value, including that which provides a smoked appearance. The finish does not interfere with transparency if desired to allow recipes or other materials to be visible and readable through the sheet when placed in contact with the sheet. Suitable finishes include those of translucent sheets that diffuse light to the extent that materials appear blurry and unreadable when separated from it by a distance but are readable when placed in contact with the sheet. The finish of the sheet results in a surface that does not retain food material after cleaning, and the material selected will tolerate cleaning in a dishwasher with temperatures in excess of 180 degrees F.

These and other advantages of the invention will be more particularly realized by a reading of the following detailed description of the invention together with the drawings in which like reference numerals refer to like parts throughout and in which:

BRIEF DESCRIPTION OF THE DRAWINGS

FIG. 1 is a perspective view of the cutting sheet showing its use in transferring prepared food materials to a suitable container.

FIG. 2 is a perspective view of the cutting sheet showing its use in cutting food articles.

FIG. 3 is a plan view of the cutting sheet.

FIG. 4 is an enlarged cross-sectional view taken on line 4—4 of FIG. 3 showing the partial penetration of the thickness of the sheet by a cutting implement.

DETAILED DESCRIPTION OF THE DRAWINGS

The sheet 10 is shown to be a generally rectangular planar sheet having width-wise edges 12 and 14 corresponding to a first dimension of the sheet and lengthwise edges 16 and 18 corresponding to the lengthwise or cantilever access of the sheet. In the preferred embodiment, the sheet is extruded flat with a width corresponding to the edges 12 and 14. However, it should be understood that the first dimension in other embodiments can be the lengthwise or cantilever dimension corresponding to the edges 16 or 18. When extruded with the width corresponding to the edges 12 and 14, the product is cut to length, and to create rounded corners 20. Extrusion produces a sheet which is smooth on both sides and which therefore may be reused by turning the product over to obtain a new and sanitary surface on which to work prior to cleansing. The density of the polypropylene is selected to result in a Rockwell hardness in excess of 72. Surface hardnesses of 72 or less result in excessive spalling and perforations by cutting implements, and are prone to discoloration referred to as blushing. Products with excessive deformation have a very short useful lifetime and may have to be disposed of after each use. On products which are reused, it is difficult to determine if all of the food materials and bacteria have been removed because the heavily marked surface may not reveal what residual material may have been retained, even after washing.

Material having a Rockwell hardness up to 90 is suitable for the intended purpose without being sufficiently hard so as to dull knives and other cutting implements or sufficiently brittle to prevent adequate flexion for transfer of food.

It has been found that amorphous polypropylene copolymer (alternatively known as 1-propene, polymer with ethene) with the following properties has the requisite clarity, toughness and chemical solvent and stress-cracking resistance:

a softening point in excess of 126 degrees C.;

a Rockwell hardness of 80 as determined by the ASTM Test Method D785;

a melt-flow rate of 1.0 degrees Centigrade per minutes as determined by the ASTM Test Method 1238;

a density of 0.900 gm/CM$^3$ as determined by the ASTM Test Method 1505.

a tensile modulus of 150,000 psi as determined by ASTM Test Method D638; and a flexural modulus of 145,000 psi as determined by the ASTM Test Method 790.

A type of polypropylene having the above-described physical properties is manufactured by Rexene Products Co. of Dallas, Tex. under the brand name REXENE RESINS Polypropylene 9231.

FIG. 4 shows the penetration into the upper surface 22 of a knife blade 24. In order to prevent perforation during normal use of sharp implements through the lower surface 26, it is necessary to provide material of the type described with a thickness in the range of 0.008 inches to 0.060 inches, although it is preferred that the thickness be in the range of 0.008 inches to 0.030 inches. Although sheet thicknesses in excess of 0.060 inches would not be perforated by cutting, they cannot be flexed to transfer the food as hereinafter described.

FIG. 2 shows the use of the sheet 10 on a counter top 28, a knife 30 with blade 24 is being utilized to slice a food article 32 (celery in this instance) into suitable size pieces 34. After all of the food articles have been cut to the appropriate size, they are transferred to an appropriate container in the manner hereinafter described. However, for purposes of illustration, it is assumed that vegetables or other food articles being shown in FIG. 2 were prepared after chicken or other food articles had previously been prepared on the opposing surface 26. FIG. 1 shows the sheet 10 which has been flexed by being grasped by the user adjacent one end. A large piece of prepared chicken 36 is positioned with its center of mass closely proximate to the opposite end. As illustrated, the sheet has a width of approximately 11 inches and a length of approximately 15 inches. Therefore, the weight of the chicken or other food article 36 is supported on a cantilever beam support formed by the flexion of the sheet. Weights in excess of five ounces can be supported in this manner at distances as great as 12 to 14 inches from the held end. Food articles so supported can be transported substantial distances (for example across the room) to a suitable container such as the bowl 38. When the sheet 10 is rested on the upper edge 40 of bowl 38, it has sufficient flexibility to product a substantial line of contact around the circumference of the bowl. This additional support allows the user to raise the held end of the sheet sufficient distance to cause the food articles to slide off of the sheet and into the bowl under the influence of gravity. Transfer of the material is facilitated by the finish of the material produced by the extrusion process.

Obviously, other embodiments and modifications of the present invention will occur readily to those of ordinary skill in the art in view of these teachings. Therefore, this invention is to be limited only by the following claims, which include all such other embodiments and modifications when viewed in conjunction with the above specification and accompanying drawings.

I claim:

1. A flexible sheet for cutting and handling articles thereon, comprising:

a sheet of flexible resilient plastic material having lay-flat characteristics, a width greater than 6 inches and a length greater than 10 inches;

said plastic material having a Rockwell hardness between 72 and 90;

said plastic material having a thickness between 0.008 inches and 0.060 inches;

said sheet having sufficient cantilever beam strength when flexed around the longitudinal centerline and held proximate a first end to support an article spaced at least 10 inches from said first end and weighing at least 5 ounces.

2. The sheet of claim 1, wherein:
said plastic material is comprised of extruded amorphous polypropylene co-polymer.

3. The sheet of claim 1, wherein:
said thickness is between 0.008 inches and 0.030 inches.

4. The sheet of claim 1, wherein:
said plastic material is transparent.

5. The sheet of claim 1, wherein:
said material having a Rockwell hardness in the range of 75–90.

6. A flexible cutting sheet for food preparation, comprising:
a sheet of plastic sheet material having a thickness of less than 0.030 inches and a flexural modulus in the range of 75,000 to 200,000 psi;
said sheet having a Rockwell hardness in excess of 72.

7. A flexible cutting sheet for food preparation according to claim 6, wherein:
said sheet having a first dimension in excess of 6 inches and a second dimension, transverse to said first dimension, in excess of 10 inches.

8. A flexible cutting sheet for food preparation according to claim 7, wherein:
said sheet having a Rockwell hardness in the range of 75–90.

9. A flexible cutting sheet for food preparation according to claim 6, wherein:
said plastic sheet material comprises extruded amorphous polypropylene co-polymer.

* * * * *